United States Patent [19]

Higbee

[11] Patent Number: 4,691,875
[45] Date of Patent: Sep. 8, 1987

[54] PLANETARY INERTIAL SEAT BELT RETRACTOR

[75] Inventor: Wallace C. Higbee, Romeo, Mich.

[73] Assignee: TRW Automotive Products Inc., Lyndhurst, Ohio

[21] Appl. No.: 797,593

[22] Filed: Nov. 13, 1985

[51] Int. Cl.⁴ .................. B60R 22/38; B65H 75/38
[52] U.S. Cl. ........................... 242/107.4 B; 280/806
[58] Field of Search ............... 242/107.3, 107.4 B; 280/806; 297/478

[56] References Cited

U.S. PATENT DOCUMENTS

| 3,910,525 | 10/1975 | Takada | 242/107.4 B X |
|---|---|---|---|
| 3,915,400 | 10/1975 | Takada | 242/107.4 B |
| 4,032,081 | 6/1977 | Murnane | 242/107.4 B |
| 4,082,236 | 4/1978 | Stephenson et al. | 242/107.4 B |
| 4,416,430 | 11/1983 | Totten | 242/107.3 |
| 4,427,164 | 1/1984 | Rumpf | 242/107.4 B X |
| 4,431,145 | 2/1984 | Kassai | 242/107.4 B |
| 4,565,338 | 1/1986 | Takada | 242/107.4 B |

Primary Examiner—Stuart S. Levy
Assistant Examiner—Joseph J. Hail, III
Attorney, Agent, or Firm—Tarolli, Sundheim & Covell

[57] ABSTRACT

A seat belt retractor has a ring gear connected for rotation with a seat belt reel. A planet gear and sun gear are freely rotatable about their axes. The planet gear is connected to a locking pawl, and a spring normally maintains the pawl in a release position. When the seat belt reel rotates at a rate of acceleration above a predetermined level, the inertia of the sun gear and the planet gear overcomes the action of the spring, causing the planet gear to move bodily around the sun gear. Movement of the planet gear moves the pawl to a lock position, in which it prevents withdrawal of the seat belt from the reel.

12 Claims, 6 Drawing Figures

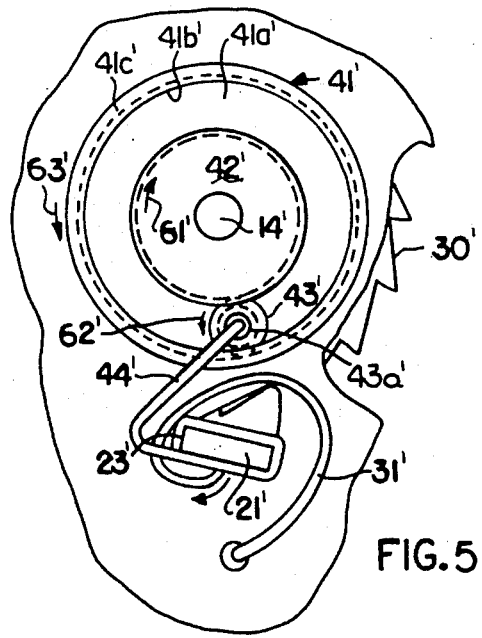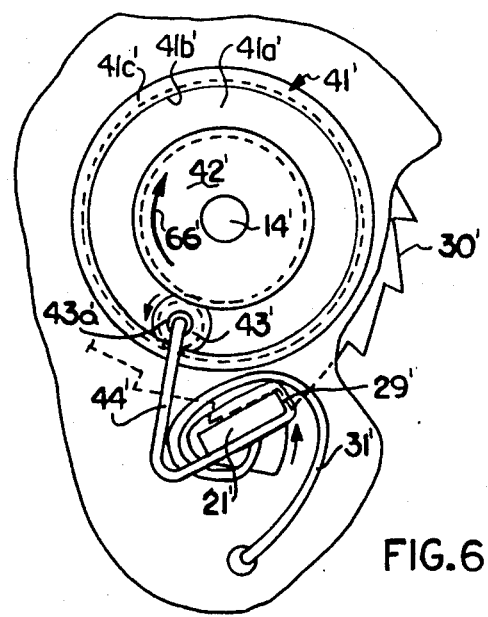

PLANETARY INERTIAL SEAT BELT RETRACTOR

BACKGROUND OF THE INVENTION

This invention relates to a seat belt retractor, and more particularly to a novel and improved web sensitive seat belt retractor. A web sensitive seat belt retractor is one which is constructed to lock up and prevent withdrawal of the seat belt upon high acceleration of the seat belt in the withdrawal direction.

PRIOR ART

Web sensitive seat belt retractors are known. They are relatively complex in structure and are somewhat bulky. In such retractors, an inertia-responsive device is provided which permits rotation of the seat belt reel in a belt withdrawal direction only when the reel acceleration is below a predetermined rate and locks the reel when the reel acceleration is above the predetermined rate. Such retractors therefore function to lock up automatically when the reel accelerates due to belt withdrawal when an accident occurs. An example of such a retractor is described in U.S. Pat. No. 4,082,236.

SUMMARY OF THE INVENTION

The present invention provides a novel and improved web sensitive seat belt retractor which is structurally simple, compact, and reliable.

There are several aspects of the present invention. In accordance with one aspect of the invention, a planetary gear system is provided and includes a planet gear which in response to acceleration rates of the seat belt reel above a predetermined value actuates a pawl to lock the seat belt reel from rotation in the belt unwinding direction.

In accordance with another aspect of this invention, a seat belt reel and pawl structure is provided in which the pawl is actuated to lock the reel from rotation in the belt unwinding direction in response to bodily movement of a gear which gear is connected by a shaped wire structure to the pawl.

A seat belt retractor embodying the present invention includes a planetary gear system which senses the acceleration of the seat belt reel. The planetary gear system includes a sun gear, a ring gear and a planet gear meshing with the sun gear and ring gear. Either the sun gear or ring gear is connected to the seat belt reel for rotation therewith, and the other of the two gears freely rotates relative to the reel. The planet gear is connected to a pawl which operates to lock the reel when reel acceleration exceeds a predeterined value. A spring normally biases the pawl so that the reel can freely rotate. When the reel accelerates at a high rate, the inertia of the sun or ring gear, whichever freely rotates relative to the reel, is such that the gear cannot immediately follow the reel acceleration. Thus, the planet gear moves ("walks") bodily about the central axis of the sun or ring gear. This movement overcomes the biasing force of the spring so that the pawl moves to lock the reel against rotation.

BRIEF DESCRIPTION OF THE DRAWINGS

The above and other features of the present invention will be apparent to one skilled in the art to which the present invention relates from the following detailed description of preferred embodiments of the present invention made with reference to the accompanying drawings, in which:

FIG. 4 is an enlarged, fragmentary view illustrating the structure of the spring which normally maintains the pawl in the release position;

FIG. 5 is an end elevation of a second embodiment of the present invention in which the sun gear is connected to rotate with the reel and illustrating the locking pawl in a release condition so tht the seat belt reel is free to rotate in either direction; and FIG. 6 is a view similar to FIG. 5 but illustrating the locking pawl in a lock up position blocking the seat belt reel from rotation in a belt withdrawal direction.

DETAILED DESCRIPTION OF THE PREFERRED EMBODIMENTS

Figure 1:
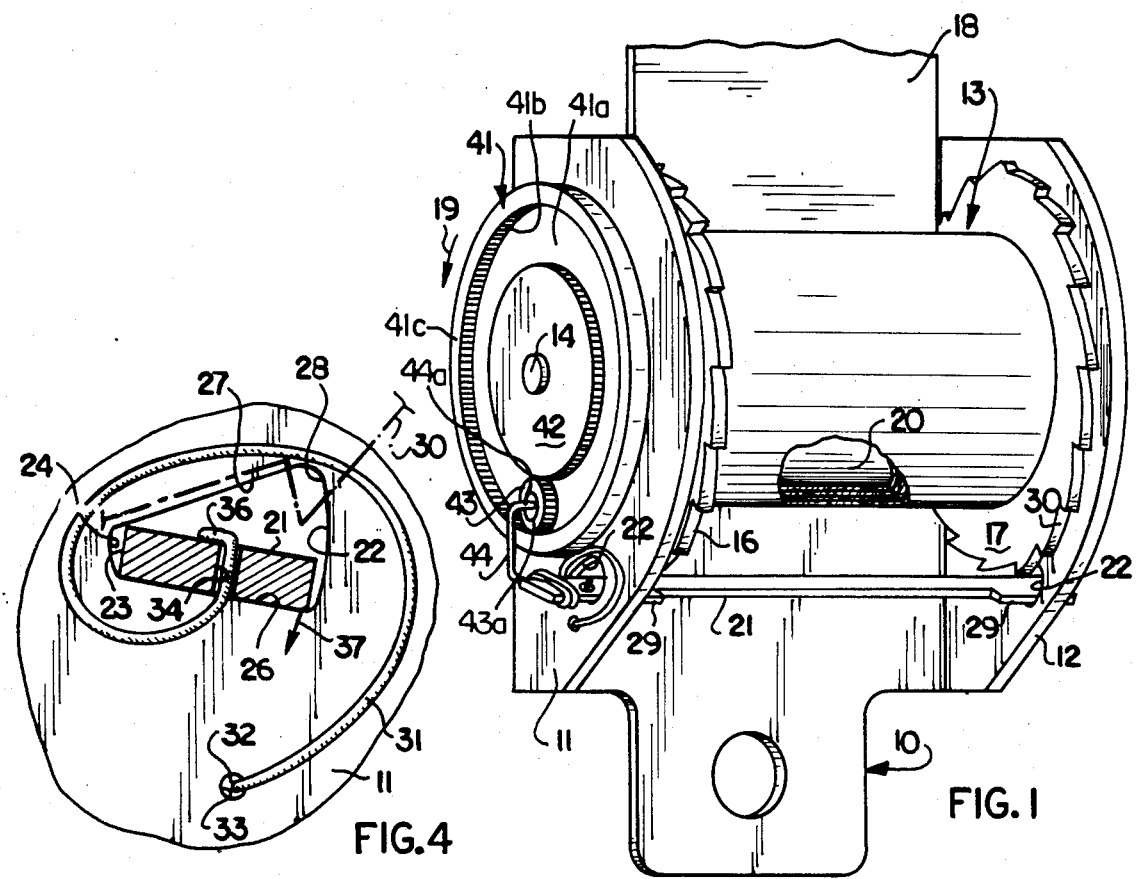
FIG. 1 is a perspective view of a seat belt retractor embodying the present invention.

FIG. 1 illustrates a seat belt retractor which includes a frame 10 having laterally spaced, substantially parallel support frame portions 11 and 12. A seat belt reel assembly 13 is located between the frame portions 11 and 12 and is fixed on a shaft 14 which is journaled at its ends in the two frame portions 11 and 12. The seat belt reel assembly 13 includes a pair of toothed ratchet wheels 16, 17 and a reel 20. One ratchet wheel 16, 17 is located adjacent to each of the support frame portions 11, 12. Between the ratchet wheels 16 and 17 is the reel 20 around which a seat belt 18 is wrapped. A spring (not shown) biases the seat belt reel assembly 13 in a counterclockwise direction indicated by the arrow 19 in FIG. 1 so as to automatically wind the set belt 18 onto the reel.

A locking pawl 21 extends across the frame 10 and projects at its ends through a pair of similar openings 22 formed in the two support frame portions 11 and 12. The pawl 21 has a rectangular cross section, as best illustrated in FIG. 4. The openings 22 are shaped so that the pawl 21 can pivot between two positions about one side edge 23 of the pawl. Specifically, each opening 22 has a narrow end 24 with a width substantially equal to the width of the side edge 23 of the pawl 21. From the narrow end 24, two walls 26, 27 of the opening diverge to a wide end 28. In effect, the openings 22 are generally triangular in shape so that the pawl 21 can move between a release position against the wall 26, as illustrated in FIGS. 2 and 4, and a locked position against the wall 27, as illustrated in FIG. 3.

Figure 2:
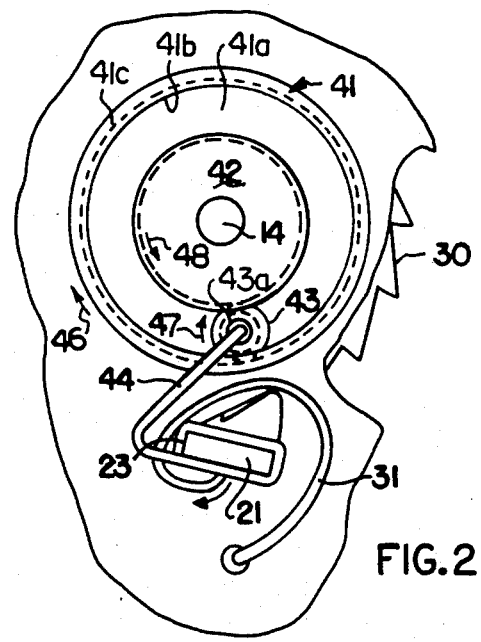
FIG. 2 is a fragmentary end elevation of the retractor of FIG. 1, illustrating the ring gear connected to rotate with the reel and the locking pawl in a release condition so that the seat belt reel is free to rotate in either direction.

When in the release position of FIGS. 2 and 4, the second side edge 29 of the pawl 21 is clear of the teeth 30 on the two ratchet wheels 16 and 17. When the pawl rotates in the counter clockwise direction to the position of FIG. 3, however, the edge 29 engages the teeth 30, as illustrated in FIG. 3, and prevents clockwise rotation of the seat belt reel 20. The seat belt reel 20 is thus locked against rotation in the belt unwinding direction.

As best illustrated in FIG. 4, a wire spring 31 resiliently biases the pawl 21 in a clockwise direction toward the release position illustrated in FIG. 4. The wire spring 31 is formed in a continuous curve. A projection 32 at one end of the spring 31 extends through an opening 33 in the support frame portion 11 to anchor the end with respect to the frame portion 11. The other end of the spring 31 extends through an opening 34 in the pawl 21, and is bent over at 36 to anchor such end in the opening 34. The spring applies a force illustrated by the arrow 37 biasing the pawl 21 to its release position against the wall 26.

Figure 3:
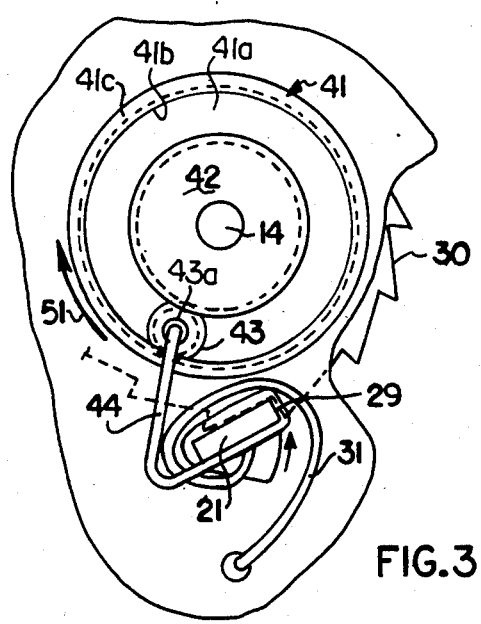
FIG. 3 is a view similar to FIG. 2, but illustrating the retractor in a lockup condition blocking the seat belt reel from rotation in a belt withdrawal direction.

A planetary gear system is provided to move the pawl 21 to its locking position shown in FIG. 3, against the bias of spring 31, when the seat belt reel 20 accelerates in a belt unwinding direction beyond a predetermined rate. This planetary gear system includes a ring gear 41, in the embodiment of FIG. 1, connected to rotate with the reel 20. The planetary gear system also includes a sun gear 42 which is journaled for free rotation on the shaft 14 and a planet gear 43 which has teeth that mesh with the teeth of both the ring gear 41 and the sun gear 42. The ring gear 41 has a hub portion 41a which is keyed or otherwise fixed to the shaft 14. The gear teeth 41b of the ring gear 41 are located on an annular rim portion 41c of the gear 41 which is fixed to an projects axially from the hub portion 41a.

The planet gear 43 has an axial opening 43a. A shaped wire 44 has a portion 44a projecting into the opening 43a as best illustrated in FIG. 1. The shaped wire 44 extends axially away from the planet gear 43 and then radially to a position adjacent to the end of the pawl 21, where it is wrapped around and anchored on the pawl. When the pawl 21 is in the release position of FIG. 2, the planet gear 43 is preferably locted a small distance to the right (as viewed in FIG. 2) of a line connecting the axis of the shaft 14 and the end 23 of the pawl 21.

When the seat belt is extended at normal rates of acceleration, for example, when the vehicle passenger buckles the seat belt, the ring gear 41 rotates in a clockwise direction indicated by the arrow 46 in FIG. 2. This causes clockwise rotation of the planet gear 43 about its axis, as indicated by the arrow 47, and counterclockwise rotation of the sun gear as indicated by the arrow 48. Since acceleration of the reel 20, and in turn the ring gear 41, is at a sufficiently low rate, the planet gear 43 remains in the position of FIG. 2.

However, if the seat belt is withdrawn with a rapid acceleration, for example, if there is a "yank" on the belt such as would occur in an accident, the reel 20 and the ring gear 41 accelerate very rapidly in the clockwise direction, as indicated by the relatively large arrow 51, in FIG. 3. When the acceleration rate of the ring gear 41 is sufficiently high, the inertia of the sun gear 42 resisting accelerated rotation about its axis is sufficiently great that rotation about its own axis at the accelerated rate cannot occur. As a result, the planet gear 43 bodily moves, "walks", around the sun gear in a counterclockwise direction against the bias of spring 31. When the planet gear 43 "walks" around the axis of the sun gear 42, the planet gear 43 moves the shaped wire 44 and causes the wire 44 to pivot the locking pawl 21 to its locked position.

The locking pawl 21 and gear geeth 30 are formed so that they interlock and remain in the locked condition so long as a tension remains on the seat belt. However, once the tension is removed from the seat belt, the spring 31 returns the locking pawl 21 to the release position and, through the shaped wire 44, assists in returning the planet gear 43 to the release position of FIG. 2.

From the above, it should be clear that the planet gear 43 moves about the axis of the sun gear 42, while the shaped wire 44 moves with the locking pawl 21 about a different axis at the side 23 of the locking pawl 21. To allow for such movement, the opening 43a is large enough to provide clearance between the planet pinion 43 and the shaped wire 44.

The gears 41, 42 and 43 may be made of metal or plastic. In the event gear 41 is made of plastic, a metal weight may be added to the gear 41 to add mass to the gear 41 and thus provide the proper inertia.

In the embodiment of FIGS. 5 and 6, parts similar to the parts of the embodiment of FIGS. 1-4 are designated with the same reference number with a prime added. In the embodiment of FIGS. 5 and 6, the sun gear 42' is connected to rotate with the reel 20' and the ring gear 41' is journaled for free rotation on the shaft 14'. When the seat belt is withdrawn, the sun gear 42' rotates in a clockwise direction, as indicated by the arrow 61'. This causes counterclockwise rotation of the planet gear 43' about its axis, as indicated by the arrow 62'. When the rate of acceleration of set belt withdrawal is sufficiently low, the spring 31' maintains the pawl 21' in its release position of FIG. 5, and maintains the planet gear 43' in its release position. The ring gear 41' thus rotates counterclockwise about its axis as indicated by the arrow 63'.

On the other hand, when the seat belt is withdrawn at acceleration rates above a predetermined level, as occurs in an accident, the sun gear 42' accelerates rapidly, as indicated by the larger arrow 66' in FIG. 6. This tends to cause rapid countercloskwise acceleration of the planet gear 43' about its axis. However, sufficient inertia exists within the ring gear 41' to cause the planet gear 43' to overcome the action of the spring 31' and move to the left, as viewed in FIG. 5. Specifically, the gear 43' "walks" around gear 41'. This causes the pawl 21' to rotate in a counterclockwise direction to its locked position. The reel remains locked only so long as tension remains on the seat belt. When the seat belt tension is released, the main spring of the reel commences counterclockwise retracting rotation of the reel 20' causing the release of the pawl 21', so that the spring 31' can return the pawl 21' to its released position.

In each of the two embodiments, a belt or web acceleration sensitive system is provided which causes automatic locking of the reel whenever rapid withdrawal of the belt occurs. In the embodiment of FIGS. 1 through 4, the inertia of the planet gear 43 and the sun gear 42 is sufficiently great to overcome the action of the spring 31 when an acceleration rate exceeding the maximum allowable rate occurs. Similarly, in the embodiment of FIGS. 5 and 6, the inertia of the planet gear 43' and the ring gear 41' is sufficiently great to overcome the action of the spring 31' when an acceleration rate exceeding the maximum allowable rate occurs.

With this invention, a simple mechanism involving merely a shaped wire and a planetary gear set, effects locking the reel when withdrawal of the web at high acceleration occurs. Further, since the teeth of gears 41, 42 and 43 all lie in a common plane which extends perpendicular to the axis of the reel 20, a small compact structure is provided. Also, the shaped wire 44 which acts as the actuator for the pawl 21 is a simple structure requiring little space.

Although preferred embodiments of this invention have been shown and described, it should be unerstood that various modifications and rearrangements of the

What is claimed is:

1. A seat belt retractor comprising:
   a seat belt reel rotatable about an axis in belt retraction and belt withdrawal directions;
   a locking pawl movable between a lock position preventing rotation of said reel in said belt withdrawal direction and a release position allowing rotation of said reel in said belt withdrawal direction;
   a planetary gear system including a sun gear, a planet gear, and a ring gear, said planet gear meshing with said sun gear and ring gear;
   one of said sun and ring gears being connected to rotate about its axis as a function of the rotation of said reel and the other of said sun and ring gears being journaled for free rotation about its axis;
   connecting means between said planet gear and pawl for moving said pawl to said lock position in response to bodily movement of said planet gear to an operative position and for moving said pawl to said release position in response to bodily movement of said planet gear to a non-operative position; and
   spring means for biasing said pawl toward said release position;
   said planet gear and said other of said sun and ring gears having a predetermined inertia such that said planet gear remains in said non-operative position when said reel rotates in said belt withdrawal direction at a rate of acceleration less than a predetermined rate and moves to said operative position and causes said pawl to lock said reel when said reel rotates in said belt withdrawal direction at a rate of acceleration greater than said predetermined rate;
   said connecting means comprising a part projecting axially of said planet gear and connected to said pawl and operable to move said pawl from said release position to said lock position in response to movement of said planet gear to said operative position;
   said pawl being radially spaced from the axis of said reel beyond said ring gear; and
   said part being a shaped wire extending from said planet gear to said pawl.

2. a seat belt retractor as set forth in claim 1 wherein said wire has a portion wrapped around said pawl.

3. A seat belt retractor as set forth in claim 2 wherein said spring means operates through said shaped wire to apply a spring bias to said planet gear.

4. A seat belt restractor as set forth in claim 1 wherein said spring means operates through said connecting means to apply a spring bias to said planet gear.

5. A seat belt retractor as set forth in claim 1 wherein said ring gear is connected to said reel for rotation therewith and said sun gear is freely rotatable relative to said reel.

6. A seat belt retractor as set forth in claim 1 wherein said sun gear is connected to said reel for rotation therewith and said ring gear is freely rotatable relative to said reel.

7. A seat belt retractor comprising:
   a seat belt reel rotatable about an axis in belt retraction and belt withdrawal directions;
   a locking pawl movable between a locking position blocking said reel from rotation in said belt withdrawal direction and a release position; and
   means for moving said locking pawl from said release position to said locking position in response to rotation of said reel in said belt withdrawal direction at a rate of acceleration above a predetermined rate;
   said moving means comprising a planetary gear set including a sun gear, a ring gear, and a planet gear meshing with said sun gear and said ring gear, one of said sun gear and said ring gear being connected to said reel for rotation therewith and the other comprising an inertia member which rotates more slowly than the reel when the reel accelerates at a rate above said predetermined rate, thereby causing said planet gear to bodily rotate about the axis of said one gear; and means connecting said planet gear and said locking pawl for moving said locking pawl to its locking position in response to bodily rotation of said planet gear about the axis of said one gear, said means connecting said planet gear and said locking pawl comprising a shaped wire, said shaped wire having a portion extending into an axial opening in said planet gear, said axial opening providing clearance between said portion and said planet gear.

8. A seat belt retractor as set forth in claim 7, wherein said sun gear is connected to said reel.

9. A seat belt retractor as set forth in claim 7, wherein said ring gear is connected to said reel.

10. A seat belt retractor comprising:
    a seat belt reel rotatable about its axis in belt retraction and belt withdrawal directions;
    a shaft for rotating said seat belt reel about said axis;
    a locking pawl movable between a lock position in which rotation of said reel in said belt withdrawal direction is prevented and a release position in which rotation of said reel in said belt withdrawal direction is allowed;
    a planetary gear system including a sun gear, a planet gear, and a ring gear having internal teeth, said planet gear meshing with said sun gear and said ring gear and the teeth of said sun, planet and ring gears lying in a common plane extending transverse to the axis of said reel;
    one of said sun and ring gears being fixedly connected to said shaft for rotation about said axis upon rotation of said reel and the other of said sun and ring gears being supported by said shaft for free rotation about said axis;
    connecting means between said planet gear and pawl for moving said pawl to said lock position in response to bodily movement of said planet gear to an operative position and for moving said pawl to said release position in response to bodily movement of said planet gear to a non-operative positoion; and
    spring means for biasing said pawl toward said release position;
    said planet gear and said other of said sun and ring gears having a predetermined inertia such that said planet gear remains in said non-operative position when said reel rotates in said belt withdrawal direction at a rate of acceleration less than a predetermined rate and moves to said operative position and causes said pawl to lock said reel when said reel rotates in said belt withdrawal direction at a rate of acceleration greater than said predetermined rate.

11. A seat belt retractor as set forth in claim 10 wherein said ring gear has a hub portion extending transverse to the axis of said reel and said shaft and is supported by said shaft.

12. A seat belt retractor as set forth in claim 11 wherein said ring gear has an annular rim portion projecting axially of said hub portion and on which the internal ring gear teeth are located.

* * * * *